US008254294B2

(12) United States Patent
Vesterinen

(10) Patent No.: US 8,254,294 B2
(45) Date of Patent: Aug. 28, 2012

(54) SYSTEM AND METHOD FOR PROVIDING LOCAL IP BREAKOUT SERVICES EMPLOYING ACCESS POINT NAMES

(75) Inventor: Seppo Vesterinen, Oulunsalo (FI)

(73) Assignee: Nokia Corporation, Espoo (FI)

( * ) Notice: Subject to any disclaimer, the term of this patent is extended or adjusted under 35 U.S.C. 154(b) by 1136 days.

(21) Appl. No.: 12/121,505

(22) Filed: May 15, 2008

(65) Prior Publication Data

US 2008/0285492 A1 Nov. 20, 2008

Related U.S. Application Data

(60) Provisional application No. 60/930,871, filed on May 18, 2007.

(51) Int. Cl.
*H04B 7/00* (2006.01)
(52) U.S. Cl. .............. 370/259; 370/310.2; 370/328; 370/911; 709/223; 709/238
(58) Field of Classification Search .................. None
See application file for complete search history.

(56) References Cited

U.S. PATENT DOCUMENTS

| | | | | |
|---|---|---|---|---|
| 6,608,831 | B1 * | 8/2003 | Beckstrom et al. | 370/352 |
| 2006/0171306 | A1 | 8/2006 | Stout et al. | 370/229 |
| 2006/0271341 | A1 * | 11/2006 | Brown et al. | 703/1 |
| 2007/0133517 | A1 * | 6/2007 | Miller et al. | 370/352 |
| 2010/0272063 | A1 * | 10/2010 | Kato et al. | 370/331 |
| 2010/0290394 | A1 * | 11/2010 | Noldus | 370/328 |

FOREIGN PATENT DOCUMENTS

| | | |
|---|---|---|
| WO | WO 03/079636 A1 | 9/2003 |
| WO | WO 2006/124577 A2 | 11/2006 |

OTHER PUBLICATIONS

"Multiple PDNs for LET Accesses," SA WG2 Temporary Document, Apr. 23, 2007-Apr. 27, 2007, pp. 1-6, 3GPP TSG SA WG2 Architecture, S2#57, No. S2-071752, Ericsson, Beijing, China.
"Multiple PDNs for non-3GPP Accesses," SA WG2 Temporary Document, Apr. 23, 2007-Apr. 27, 2007, pp. 1-2, 3GPP TSG SA WG2 Architecture—S2#57, No. S2-071755, Ericsson, Beijing, China.
"3GPP TS 36.300: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," Version 1.0.0, Mar. 2007, pp. 1-82, 3GPP Organizational Partners, Sophia-Antipolis Cedex, France.
O'Droma, et al., "'Always Best Connected' Enabled 4G Wireless World," Proc. of the 12th European Union IST Summit on Mobile and Wireless Communications, Jun. 2003, pp. 710-716, Aveiro, Portugal.

* cited by examiner

*Primary Examiner* — Chi H. Pham
*Assistant Examiner* — Shick Hom
(74) *Attorney, Agent, or Firm* — Squire Sanders (US) LLP

(57) ABSTRACT

A method, apparatus and system are provided for acquiring an access point name for an application employing a local Internet protocol breakout service. In one embodiment, the apparatus includes a user management subsystem (820) configured to initiate an Internet protocol application. The apparatus also includes a local breakout service monitoring subsystem (810) configured to monitor availability of a local Internet protocol local breakout service and to obtain an access point name from the local Internet protocol local breakout service when the local Internet protocol local breakout service is available. The apparatus also includes an access point name selection control subsystem (830) configured to bind the access point name to the Internet protocol application.

30 Claims, 12 Drawing Sheets

SYSTEM AND METHOD FOR PROVIDING LOCAL IP BREAKOUT SERVICES EMPLOYING ACCESS POINT NAMES

This application claims the benefit of U.S. Provisional Application No. 60/930,871 entitled "System and Method for Providing Local IP Breakout Services Employing Access Point Names," filed on May 18, 2007, which is incorporated herein by reference.

TECHNICAL FIELD

The present invention is directed, in general, to communication systems and, more particularly, to a system and method for providing local Internet protocol ("IP") breakout services in IP cellular networks.

BACKGROUND

The International Mobile Telecommunication—Advanced ("IMT Advanced") vision of complementary interconnected access systems for the next generation mobile communication networks in International Telecommunication Union ("ITU") foresees a seamless inter-working between the traditional wide area cellular mobile systems and local area systems. The latter is named to IMT-A nomadic local area concept that is built of wireless hot spots or local coverage. A long-term evolution/system architecture evolution ("LTE/SAE") cellular operator may support IMT-A compliant local area systems by providing a local Internet protocol connectivity within a certain area (referred to as a "local IP breakout service area") with roaming, with limited user mobility and Internet protocol session continuation (nomadic mobility). The local IP connectivity may cover a local zone in a city center or any limited geographical area, an enterprise network, or a home network wherein LTE radio coverage is available. At a minimum, the local IP breakout service area can be provided using one LTE cell/base station and may be expanded to a wide LTE coverage area in an operator's nationwide domain or public land mobile network ("PLMN"). The LTE/SAE service with roaming, global/inter-radio access mobility with IP session continuation may be overlapping and use the same cells/base stations that provide the local IP breakout service.

Normally, user equipment such as a mobile station is connected to the LTE/SAE network so that an SAE gateway provides the IP point of attachment. The selection of the SAE gateway happens during an initial attaching procedure wherein the user equipment is authenticated and authorized to use network services. The SAE gateway can be selected either from the visited public land mobile network or user equipment's home public mobile network depending on the roaming agreement between the operators. In the case wherein an SAE gateway is selected from the visited public land mobile network, there is a question of selecting a more localized SAE gateway than a more distant default SAE gateway for a "local IP breakout service" with roaming. For the purposes of the present discussion, however, it is assumed that a more localized gateway than the SAE gateway can be selected for the "local IP breakout service" such that default IP connectivity via the SAE gateway and a local gateway may be retained in parallel. This more localized gateway may reside even in the base station that is used for the given traffic.

It is desirable that the standard LTE/SAE initial attaching procedure should support selecting one user-plane ("U-plane") anchor from the SAE gateway based on one access point name ("APN") at a time (i.e., based on one set of settings used for a connection of user equipment to the Internet). An APN is an identity of an Internet network to which a mobile station such as user equipment can be connected, or the settings that are used for that connection. This may be referred to as a "single APN concept." In the case wherein multiple active IP addresses/access point names are supported, it may cause a problem in the user equipment as there is uncertainty as to which IP address/access point name each application should select for an application level session. The selected access point name may be selected manually by the user equipment on every session initiation, or pre-configured into the user equipment per application. In the case wherein the same application uses multiple IP addresses/access point names, automatic selection rules may be employed by the user equipment.

There have been studies about an "Always Best Connected" concept wherein the user equipment is able to automatically select the best access for particular end-user services. (See, e.g., "'Always Best Connected' Enabled 4G Wireless World," by O'Droma, et al., *IST Mobile and Wireless Communications Summit*, 2003, which is incorporated herein by reference.) This access technology selection is assumed to work based on pre-configured rules in the user equipment. The "Always Best Connected" concept may support using multiple IP addresses in the user equipment (i.e., network interfaces for each access technology may be associated with different IP addresses). The switching function between the alternative access technologies should not cause a problem in IP address binding to an application in the user equipment because only one access technology and its associated IP address should be in use at a time. Thus, this solution does not provide a solution for using multiple IP addresses bound to access point names within the same access technology, that would provide an improvement thereby from prior art solutions.

Thus, what is needed in the art is a system and method that allows user equipment to use an IP address/access point name for a local IP breakout service in LTE/SAE that is an alternative to the default user IP address/access point name for SAE bearer services via an SAE gateway that provides global roaming and mobility support. Additionally, what is needed in the art is an application for IP multi-homing in user equipment wherein multiple IP addresses can be associated with a single network interface using, for instance, an LTE radio system.

SUMMARY OF THE INVENTION

These and other problems are generally solved or circumvented, and technical advantages are generally achieved, by embodiments of the present invention, which include a method, apparatus, and system for acquiring an access point name for an application employing a local Internet protocol ("IP") breakout service. In one embodiment, the apparatus (e.g., user equipment) includes a user management subsystem configured to initiate an Internet protocol application. The apparatus also includes a local breakout service monitoring subsystem configured to monitor availability of a local IP local breakout service and to obtain an access point name from the local IP local breakout service when the local IP local breakout service is available. The apparatus also includes an access point name selection control subsystem configured to bind the access point name to the Internet protocol application.

In a related embodiment, the local breakout service monitoring subsystem is configured to detect a loss of availability of the local IP local breakout service, and the access point name selection control subsystem is configured to place on hold and store in memory the access point name for the Internet protocol application for the local IP local breakout service and to use the access point name for the Internet protocol application from a gateway. The breakout service monitoring subsystem is also configured to detect restored availability of the local IP local breakout service and to regain an Internet protocol address from the local IP local breakout service. In accordance therewith, the access point name selection control subsystem is configured to set as a default access point name the access point name obtained from the local Internet protocol local breakout service.

In another aspect, the present invention provides an apparatus (e.g., user equipment) including a session control subsystem configured to initiate a network-originated application and a link layer control subsystem configured to determine a radio bearer through which the network-originated application is invited. The apparatus also includes an access point name selection control subsystem configured to obtain an access point name from a network-originated service inviting the network-originated application and bind the access point name to the network-originated application system. In a related embodiment, the apparatus includes a session control subsystem configured to release the access point name from the network-originated application upon termination of the network-originated application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of a system and method for providing local Internet protocol ("IP") breakout services in IP cellular networks.

Figure 1:
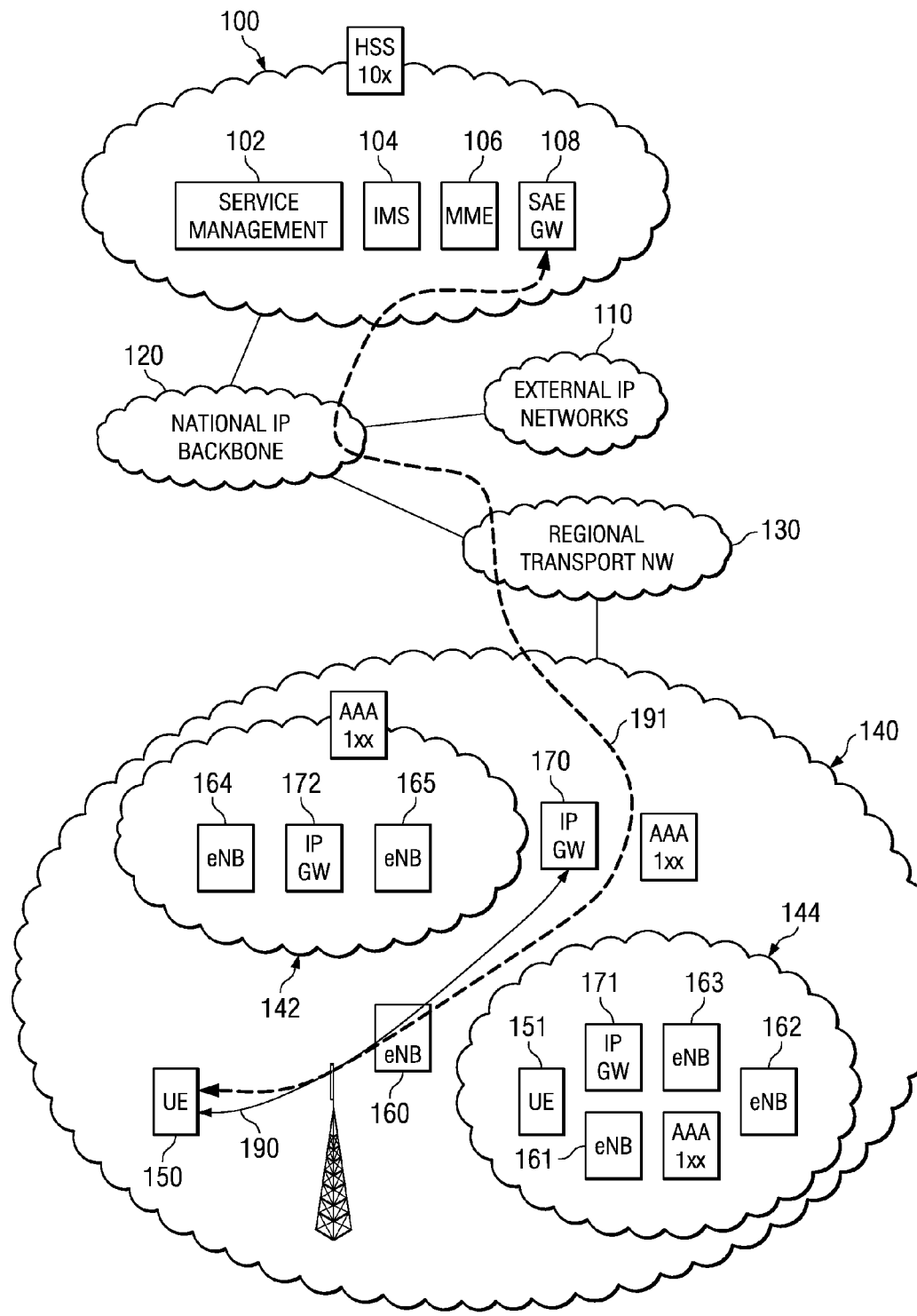
FIG. 1 illustrates a system level diagram of an embodiment of a communication network including communication systems, subsystems and modules that provide an environment for application of the principles of the present invention.

Referring initially to FIG. 1, illustrated is a system level diagram of an embodiment of a communication network including communication systems, subsystems and modules that provide an environment for application of the principles of the present invention. In this example, the communication system includes LTE/SAE communication elements. It should be understood, however, that the broad scope of the present invention is not limited to LTE/SAE communication systems, but can also be implemented in other communication systems such as, without limitation, high-speed downlink packet access, high-speed uplink packet access, and worldwide interoperability for microwave access communication systems.

The communication system includes a service core network 100 of an operator including a service management entity 102, an IP multimedia subsystem ("IMS") 104, a mobility management entity ("MME") 106, and an SAE gateway 108 coupled to a home subscriber server (designated "HSS"). Traffic between user equipment 150, 151 and the service core network 100 is carried via a national IP backbone network 120, a regional transport network 130, and a local area aggregation network 140. Base stations (designated "eNB") 160, 161, 162, 163, 164, 165 of the communication system host functions for, without limitation, radio resource management, radio bearer control, radio admission control, connection mobility control, and dynamic resource allocation (e.g., scheduling). The MME 106 is responsible for distributing paging messages to the base stations 160, 161, 162, 163, 164, 165.

Typically, communication networks as illustrated herein are based on a single switch model. The single switch model is implemented in the LTE/SAE communication system by the SAE gateway 108. In the past, the calls/services were "long distance" in nature due to forcing user traffic to pass via the SAE gateway 108. For example, a connection from user equipment 150 to an external IP network 110, such as to the Internet, is typically guided via a route indicated with a dashed line 191. As is well known in the art, improvements to communication systems have enabled "local calls/services" in the mobile communication networks.

In the following examples, embodiments are introduced for selecting and connecting to an IP gateway 170, 171, 172 (e.g., an access router) for a local IP breakout service from an LTE base station while retaining user access control to SAE gateway 108 in the LTE/SAE operator's service core network 100. It is assumed that the registration to the default SAE bearer services using an IP address from the SAE gateway 108 is available, even if not necessarily used for active sessions. A plurality of authentication, authorization, and accounting servers (designated "AAA") provide an interface between the devices and security servers through which access control can be set up.

In one embodiment, the local IP breakout services providing IP gateway services can be provided via local IP gateways 170, 171, 172. The IP gateways 170, 171, 172 may reside, for example, in a corporate network 144 or in a local area network ("LAN") 142, such as a city area. This provides optimal data routing such that all data is not required to traverse via the centralized SAE gateway 108. For example, a solid line 190 illustrates how the local IP breakout service is provided for the user equipment 150. This way, direct user equipment-to-user equipment communications (e.g., between user equipment 150, 151), user equipment-to-local services, and user equipment to Internet services become possible within the local IP breakout service area.

The user equipment 150, 151 in the local area aggregation network 140 is configured to detect availability of a local IP breakout service to an IP gateway, to start a network entry to the local IP breakout service, and to configure an IP stack of user equipment on the basis of received configuration data. A serving base station 160, 161 of the user equipment 150, 151 is configured to establish a radio bearer for the local IP breakout service, to provide a dynamic host configuration protocol relay function for mapping data of the user equipment using a local IP address to the established radio bearer, and to provide the local IP breakout service to the IP gateway 170, 171, 172, while retaining user access control to a remote IP gateway of a service core network 100 of the public land mobile network for the user equipment 150, 151.

In one embodiment, the availability of the local IP breakout service via the user equipment's 150, 151 current LTE cell/base station 160, 161, 162, 163, 164, 165 may be indicated to the user equipments 150, 151 as set forth below. For instance, advertisements in LTE cell system information from the base station (configured into LTE cell/base station radio network configuration data) my indicate the local IP breakout service availability to the user equipment 150, 151 in a non-access stratum ("NAS") signaling when the user equipment 150, 151 has moved to a service coverage area (e.g., as part of a tracking area update procedure, idle-to-active state transition or inter-LTE base station handover, which is a location-based service triggered from an evolved packet core). The user equipment 150, 151 themselves may detect movement to an LTE cell in which cell identification, tracking area identification, and network identification match local IP breakout service-related information stored in non-volatile memory of the user equipment 150, 151, or a user intervention from an application level when the end user is, for instance, at the office (i.e., manual registration into an enterprise network). When the user equipment 150, 151 has received the indication about service availability, the network entry procedure to a local IP breakout service may be started automatically from the user equipment 150, 151, or manually by end-user intervention.

The scope of IP connectivity via the local IP breakout service may be from one LTE cell/base station 160, 161, 162, 163, 164, 165 to a tracking area that is formed from multiple neighboring LTE cells/base stations covering the following exemplary cases as set forth below. The IP connectivity may be direct connectivity to the Internet from a home LTE cell/base station using a wireless local area network ("WLAN") access point and a digital subscriber line ("DSL") modem (that could be the nearest LTE cell to the home, not necessarily inside the house, e.g., a designated cell in the neighborhood). An enterprise network providing intranet connectivity to local services and a direct connectivity to the Internet via an enterprise gateway may also provide IP connectivity. "Pico" LTE base stations may be applied for improving indoor coverage in corporate premises that with nearby public LTE cells/base stations form a local IP breakout service tracking area in which cells may be shared with LTE/SAE users using SAE gateway services. A local zone (e.g., a shopping center, a city area, etc.) including multiple cells/base stations forming a tracking area that is shared by LTE/SAE users and local IP breakout users may also provide IP connectivity.

In order to provide mobility within the local IP breakout area, the communication system informs the user equipment 150, 151 about neighboring LTE cells in which the local IP breakout service may continue. The communication system can indicate the list of neighboring cells and tracking area identification in conjunction with an initial attaching procedure, network entry to local IP breakout service, or in ordinary handover related measurement control from the LTE base station to the user equipment. Whether or not the local service area (i. e., the area wherein local IP breakout service is available) is continuous within a geographical area is a matter of network planning by the operator.

The authentication into the LTE/SAE network can be trusted in cases wherein the LTE/SAE operator provides the IP gateway 170, 171, 172 for the local IP breakout service. In enterprise network solutions, the user/user equipment is authenticated and authorized separately to enable user-plane connection to the enterprise intranet. The LTE base stations 160, 161, 162, 163, 164, 165 may support user equipment authentication to an enterprise network authentication server (e.g., by using an Internet engineering task force-specified authentication protocol). The static information/settings for this feature in the LTE base station may be included in the base station configuration data and the dynamic user/user equipment specific information may be received from the service core network 100 (e.g., from the MME 106).

The user equipment 150,151 may receive an IP address for the local IP breakout service with authentication-related signaling. If the authentication procedure does not support IP address assignment, the user equipment 150, 151 obtains the local IP address by using, for instance, a dynamic host configuration protocol ("DHCP") over the newly established radio bearer. DHCP allows the user equipment 150, 151 to request and obtain an IP address from a DHCP server, which maintains a list of IP addresses available for assignment. The LTE base station 160, 161, 162, 163, 164, 165 provides a DHCP relay function in order to forward DHCP related messages to/from a local DHCP server and to be able to read received IP configuration data for mapping the user data using the local IP address to the radio bearer (e.g., employing an IP lookup in an LTE base station).

Once the user equipment 150, 151 has configured its IP stack (either based on received configuration data in authentication or using DHCP), the radio bearer for local IP breakout is set up. A third generation partnership program ("3GPP")-compliant user equipment associates the newly configured IP address with an access point name according to a standard. An access point name ("APN") is a name of an access point for, as an example, a general packet radio service ("GPRS"). An access point is an Internet network location to which user equipment can be connected, a set of settings employable for that connection, or a particular option in a set of settings in the user equipment. The access point name may be given to the user equipment in its subscription data (i.e., pre-configured), in non-access stratum signaling from a service core network, advertised by an LTE base station, or included in authentication or DHCP signaling. In accordance therewith, the LTE base station 160, 161, 162, 163, 164, 165 has configured its network interface to route the local user data and completed the network entry procedure to the local IP breakout service and, thus, local IP connectivity is available for transferring user data.

Figure 2:
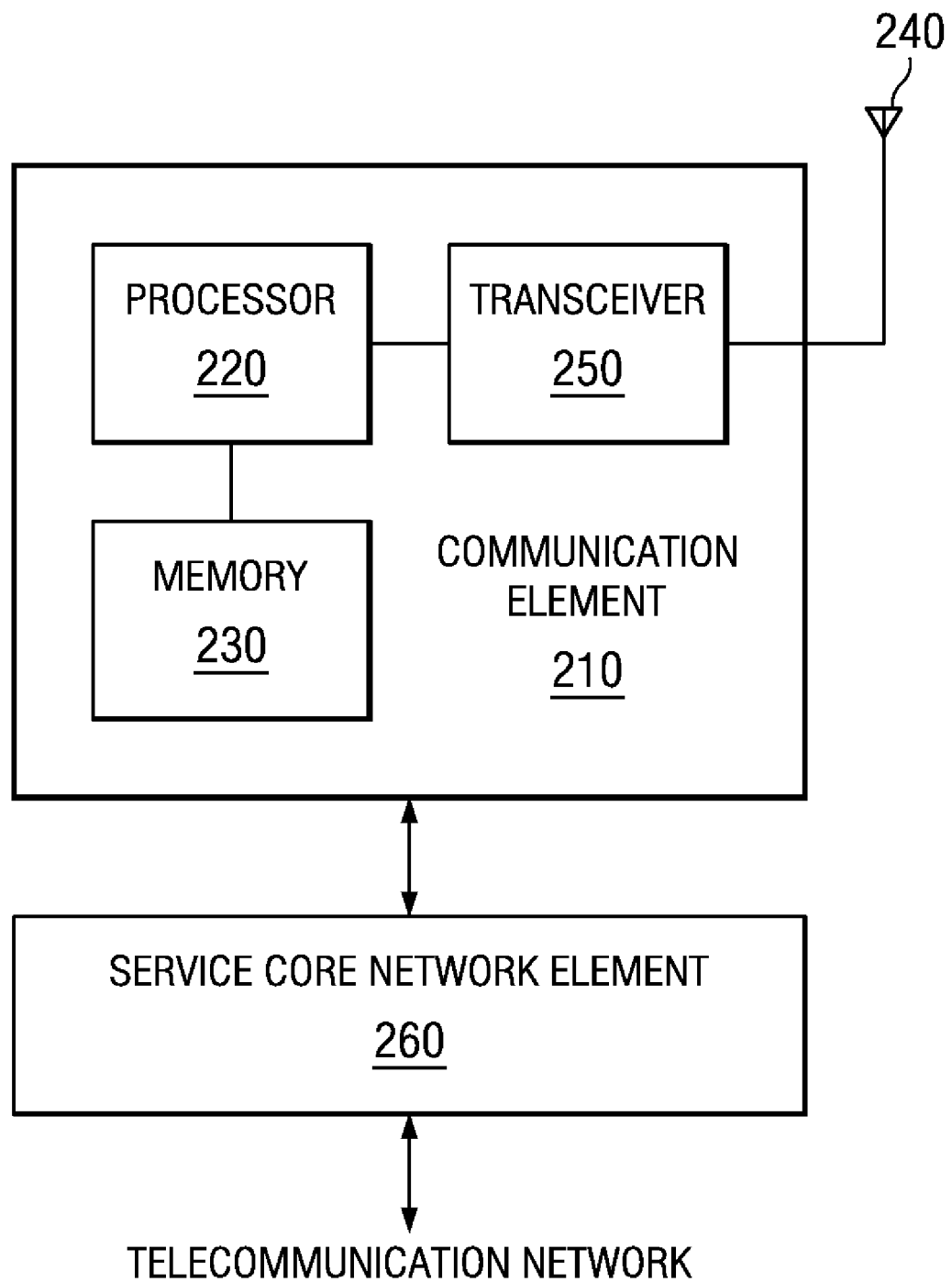
FIG. 2 illustrates a system level diagram of a communication element of a communication system that provides an environment for application of the principles of the present invention.

Turning now to FIG. 2, illustrated is a system level diagram of a communication element 210 of a communication system that provides an environment for application of the principles of the present invention. The communication element 210 may represent, without limitation, a base station, user equipment, or a service core network element. The communication element 210 includes a processor 220, memory 230 that stores programs and data of a temporary or more permanent nature, an antenna 240, and a radio frequency transceiver 250 coupled to the antenna 240 and the processor 220 for bidirectional wireless communications. The communication element 210 may provide or receive point-to-point and/or point-to-multipoint communication services.

The communication element 210 such as a base station in a cellular network may be coupled to service core network element 260 such as a mobility management entity. The service core network element 260 may, in turn, be formed with a processor, memory, and other electronic elements. The service core network element 260 preferably provides access to a telecommunication network such as a public switched telecommunication network. The access may be provided by a fiber optic, coaxial, twisted pair, or microwave communication link coupled to an appropriate link-terminating element. A communication element 210 formed as user equipment is generally a self-contained device intended to be carried by an end user.

The processor 220 in the communication element 210, which may be implemented with a plurality of processing devices, performs functions associated with its operation including, without limitation, encoding and decoding of individual bits forming a communication message, formatting of information, and overall control of the communication element 210, including processes related to management of resources. Exemplary functions related to management of resources include, without limitation, hardware installation, traffic management, performance data analysis, tracking of end users and equipment, configuration management, and end user administration, management of mobile equipment, and management of tariffs, charging, and billing. The execution of all or portions of particular functions or processes related to management of resources may be performed in equipment separate from and coupled to the communication element 210, with the results of such functions or processes communicated for execution to the communication element 210. The processor 220 of the communication element 210 may be of any type suitable to the local application environment, and may include one or more of general-purpose computers, special purpose computers, microprocessors, digital signal processors ("DSPs"), and processors based on a multi-core processor architecture, as non-limiting examples.

The transceiver 250 of the communication element 210 modulates information onto a carrier waveform for transmission by the communication element 210 via the antenna 240 to another communication element. The transceiver 250 demodulates information received via the antenna 240 for further processing by other communication elements.

The memory 230 of the communication element 210 as introduced above may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 230 may include program instructions that, when executed by an associated processor 220, enable the communication element 210 to perform tasks as described herein. Exemplary embodiments of the system, subsystems and modules as described herein may be implemented, at least in part, by computer software executable by processors of, for instance, the user equipment and the base station, or by hardware, or by combinations thereof. As will become more apparent, systems, subsystems and modules may be embodied in the communication element as illustrated and described above.

As will become more apparent in the discussion that follows, the communication element 210 is capable of acquiring an access point name for an application employing a local IP breakout service. In one embodiment, the processor 220 of the communication element is configured to initiate an Internet protocol application. The processor 220 is also configured to monitor availability of a local IP local breakout service and to obtain an access point name from the local IP local breakout service when the local IP local breakout service is available. The processor 220 is also configured to bind the access point name to the Internet protocol application.

In a related embodiment, the processor 220 is configured to detect a loss of availability of the local IP local breakout service and place on hold and store in memory 230 the access point name for the Internet protocol application for the local IP local breakout service and to use the access point name for the Internet protocol application from a gateway. The processor 220 is also configured to detect restored availability of the local IP local breakout service and to regain an Internet protocol address from the local IP local breakout service. In accordance therewith, the processor 220 is configured to set as a default access point name the access point name obtained from the local IP local breakout service.

In another aspect, the processor 220 of the communication element 210 is configured to initiate a network-originated application and determine a radio bearer through which the network-originated application is invited. The processor 220 is also configured to obtain an access point name from a network-originated service inviting the network-originated application and bind the access point name to the network-originated application system. In a related embodiment, the processor 220 is configured to release the access point name from the network-originated application upon termination of the network-originated application.

Figure 3:
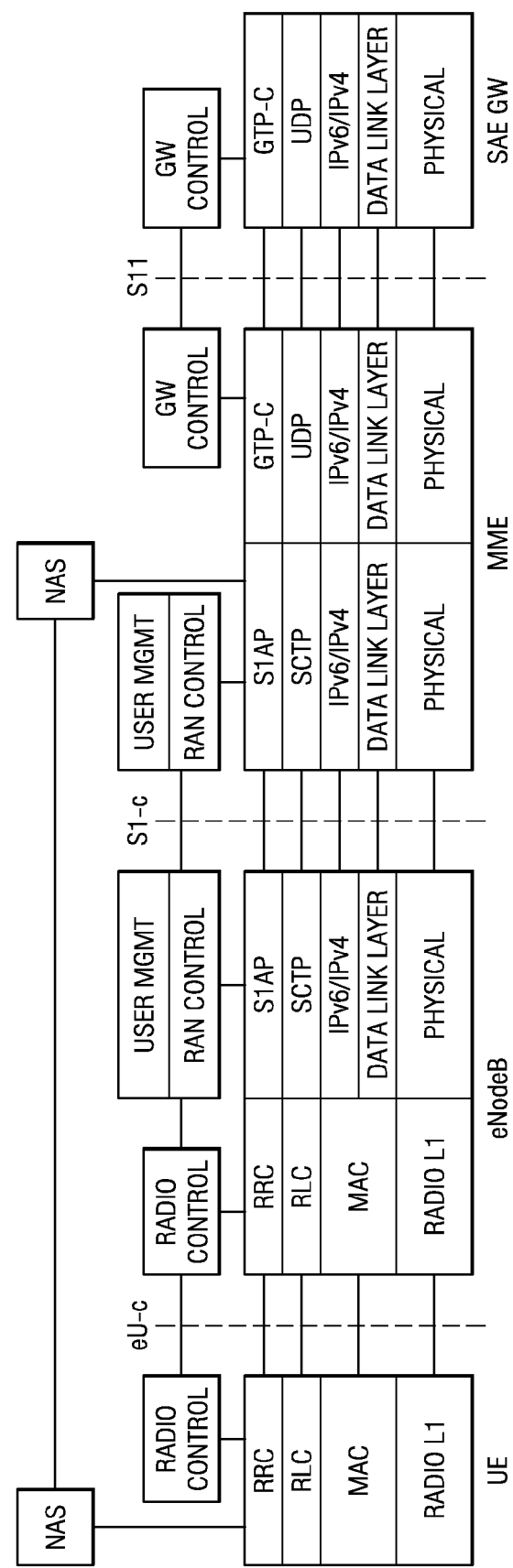
FIG. 3 illustrates a system level diagram of an embodiment of a communication network including communication systems, subsystems and modules that provide an environment for an application of the principles of the present invention.

Turning now to FIG. 3, illustrated is a system level diagram of an embodiment of a communication network including communication systems, subsystems and modules that provide an environment for an application of the principles of the present invention. The present embodiment illustrates an LTE/SAE control plane stack associated with the communication systems, subsystems and modules. The communication network includes user equipment (designated "UE"), a base station (designated "eNodeB"), a mobility management entity (designated "MME") and an SAE gateway (designated "SAE GW").

A radio resource control ("RRC") subsystem is applied for managing radio links between the user equipment and a base station. An S1 application protocol ("S1AP") subsystem is used for radio access network ("RAN") management procedures between the base station and the MME in the service core network. The RRC and S1AP subsystems carry non-access stratum ("NAS") level management messages between the user equipment and the MME. The GPRS tunneling protocol-control ("GTP-C") subsystem is used for gateway management procedures between the MME and the SAE GW. The MAC subsystem maps the logical channels to physical channels at the physical radio link layer (i.e., radio L1). The management of user equipment is performed in part with a user management subsystem (designated "User Mmgt").

Figure 4:
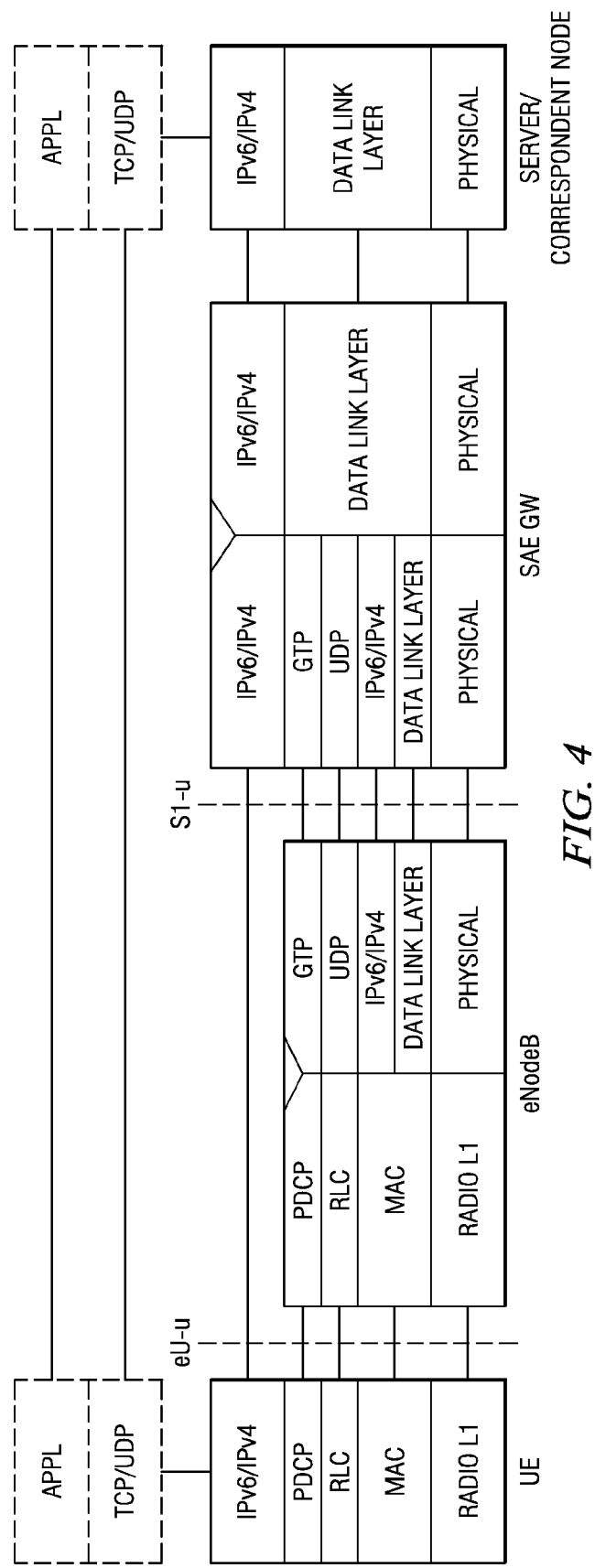
FIG. 4 illustrates a system level diagram of an embodiment of a communication network including communication systems, subsystems and modules that provide an environment for application of the principles of the present invention.

Turning now to FIG. 4, illustrated is a system level diagram of an embodiment of a communication network including communication systems, subsystems and modules that provide an environment for application of the principles of the present invention. The present embodiment illustrates an LTE/SAE user-plane stack associated with the communication systems, subsystems and modules. The communication network includes user equipment (designated "UE"), a base station (designated "eNodeB"), an SAE gateway (designated "SAE GW") and a server/correspondent node. Again, the MAC subsystem maps the logical channels to physical channels at the physical radio link layer (i.e., radio L1).

Regarding an LTE radio interface, a packet data convergence protocol ("PDCP") subsystem is used between the user equipment and the base station to perform user data ciphering and optionally IP header compression. A radio link control ("RLC") subsystem and a media access control subsystem provide data link layer connectivity between the user equipment and the base station.

Regarding an S1-u interface, the SAE GW provides an IP point of attachment to the user equipment (i.e., its "next hop router"). The user IP (end-to-end service) is mapped to a logical "SAE bearer" between the user equipment and the SAE GW. At the lower layer, the SAE bearer is further split into SAE access bearer in the access network and SAE radio bearer services over the radio interface. The GPRS tunneling protocol ("GTP") subsystem over Internet protocol/user datagram protocol ("IP/UDP") is used to carry user data between the base station and the SAE GW (i. e., end-to-end user IP packets are tunneled to/from the base station that is serving the user equipment).

Figure 5:
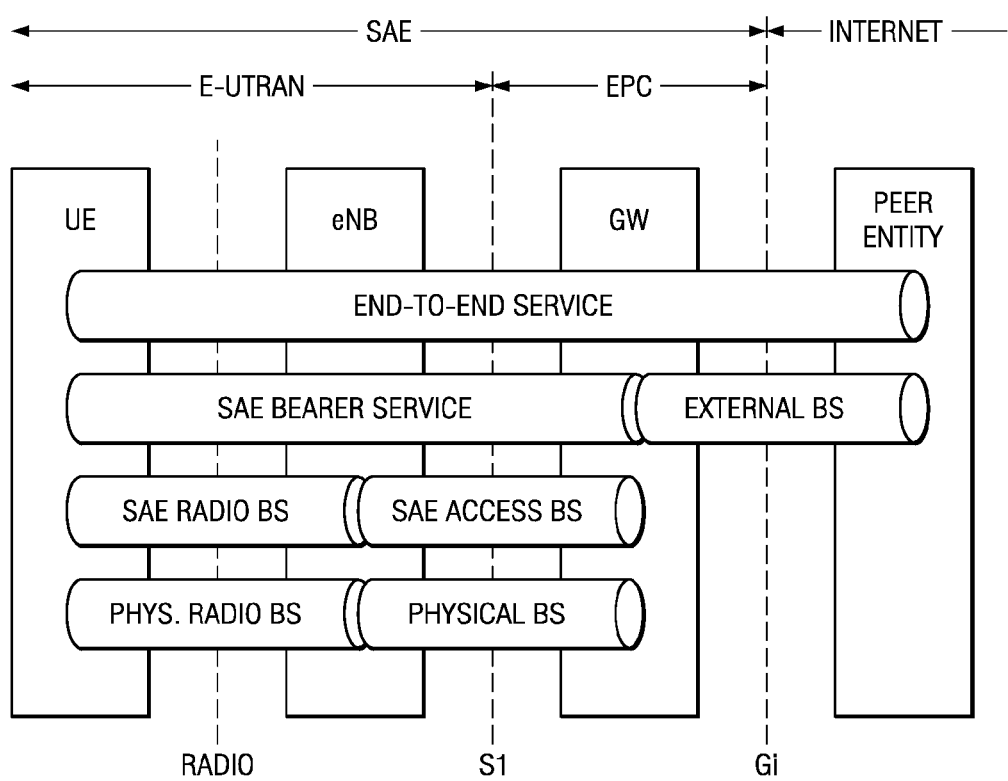
FIG. 5 illustrates a block diagram of an SAE bearer service architecture that provides an environment for an application of the principles of the present invention.

Regarding the bridging between S1-u and LTE radio interface, the base station performs bridging between the access link and the radio link (i.e., between the SAE access bearer and the SAE radio bearer services). In the downlink, the base station receives user-plane packets, reads from its GTP header with the identifiers for an SAE bearer, decapsulates the user data (e.g., an IP packet) from a GTP frame and relays it to the corresponding SAE radio bearer instance in the radio stack. In the uplink, the base station receives user data (e.g., an IP packet) from the user equipment via an SAE radio bearer service, relays it to the access network interface where it is capsulated into a GTP frame that includes the SAE bearer identifiers in the GTP header and sends it to the SAE GW. For informational purposes, FIG. 5 illustrates a block diagram of the SAE bearer service architecture according to FIG. 13.1 of 3GPP TS 36.300, entitled "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," Version 1.0.0, March 2007, which is incorporated herein by reference.

Figure 6:
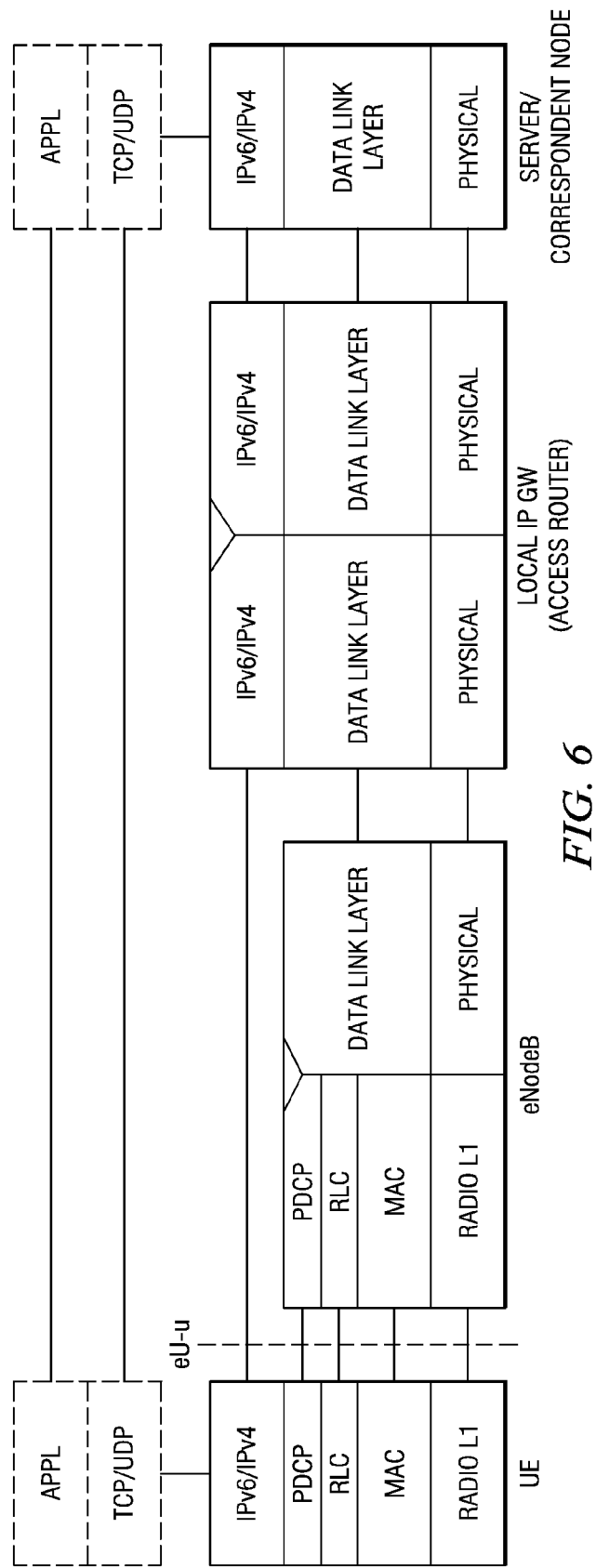
FIG. 6 illustrates a system level diagram of an embodiment of a communication network including communication systems, subsystems and modules that provide an environment for application of the principles of the present invention.

Turning now to FIG. 6, illustrated is a system level diagram of an embodiment of a communication network including communication systems, subsystems and modules that provide an environment for application of the principles of the present invention. The present embodiment illustrates an LTE local IP breakout user-plane stack associated with the communication systems, subsystems and modules. The communication network includes user equipment (designated "UE"), a base station (designated "eNodeB"), a local IP gateway (designated "local IP GW" and also known as an access router) and a server/correspondent node.

Regarding an LTE radio interface, a dedicated SAE radio bearer service is established for the local IP breakout service to differentiate traffic from the SAE bearer services both in the user equipment and the base station. Regarding an access network interface, the base station provides direct user-plane connectivity to the access network (instead of forced tunneling to an SAE GW). The base station may behave as a wireless router or a wireless L3-aware switch depending how the user IP point of attachment is selected. In case the base station is going to provide the user equipment's next hop router function, then it will be in a wireless router mode. If a local IP GW that is next hop router to the base station is used as the user equipment's next hop router, then the base station shall be in a wireless L3-aware switch mode.

Regarding the routing (or bridging) between the access network and radio interface, the base station performs routing (or bridging) between the access link and the radio link (i. e., between the local IP breakout services and the SAE radio bearer services). In the downlink, the base station receives user-plane data (e.g., IP packet), reads a destination IP address (e.g., IP lookup) and if it matches the user equipment's IP address associated with a local breakout service, forwards it to the corresponding SAE radio bearer instance in the radio stack. In the uplink, the base station receives user data (e.g., IP packet) from the user equipment via an SAE radio bearer service mapped to the local IP breakout service, and forwards it to the access network interface where it is sent as such to the access network interface.

Regarding a multi-homing problem with local IP breakout services, in the local breakout concept the user equipment is assumed to maintain and use SAE bearer services and local IP breakout services in parallel. Typically, the services require the use of different IP addresses and access point names in 3GPP compliant user equipment. This means that the user equipment becomes a "multi-homed host" that has associated multiple IP addresses per a single network interface (now LTE radio). The Appl block in FIG. 6 represents an Internet protocol application. The PDCP subsystem performs packet data convergence protocol operations. The transmission control protocol/user datagram protocol ("TCP/UDP") subsystem performs operations associated with protocols employed in computer networking.

Figure 7:
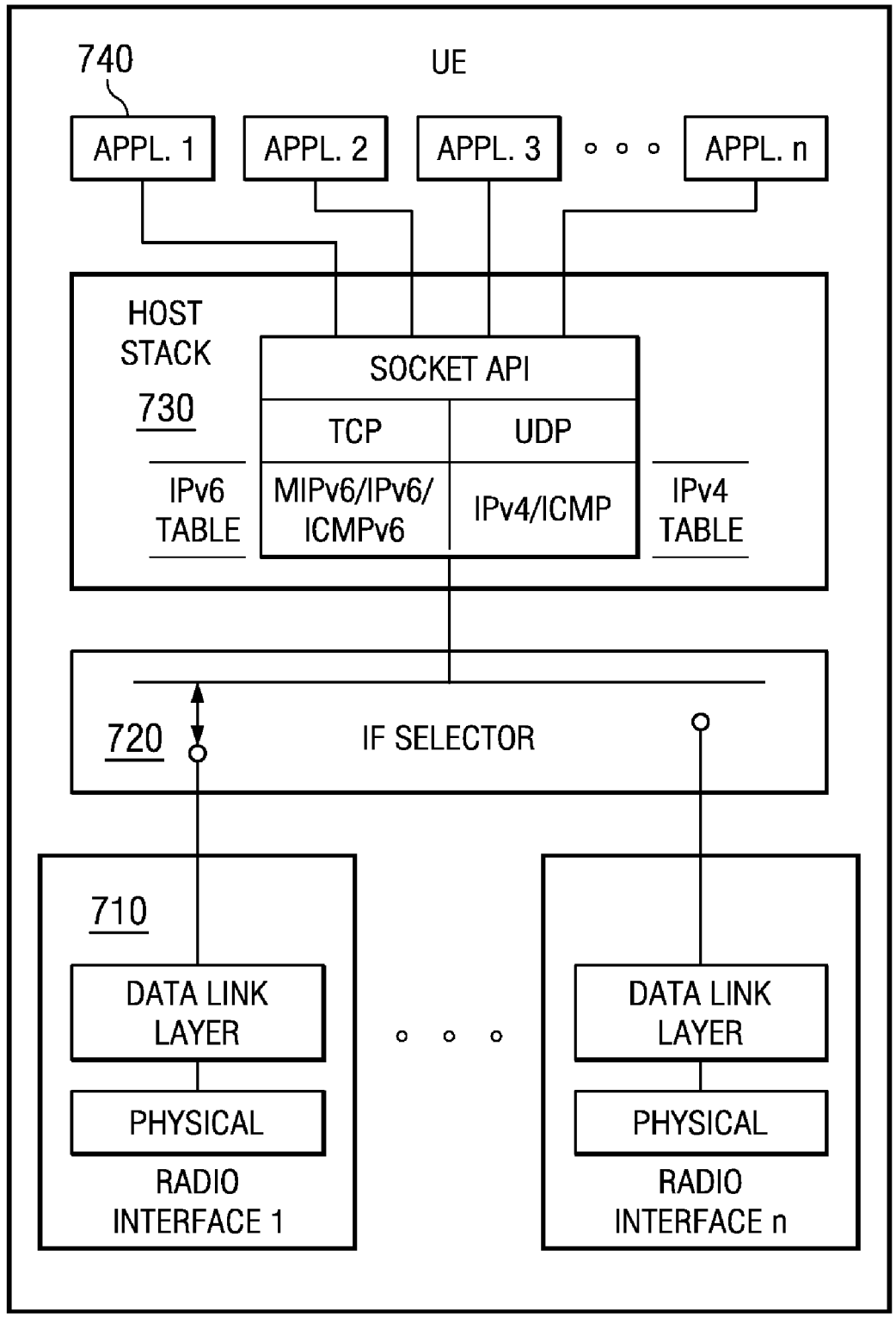
FIG. 7 illustrates a system level diagram of an embodiment of user equipment that provides an environment for an application of the principles of the present invention.

Turning now to FIG. 7, illustrated is a system level diagram of an embodiment of user equipment that provides an environment for an application of the principles of the present invention. In multi-radio capable user equipment, one or more physical radio interfaces (one of which is designated 710) can be active simultaneously via an interface selector (designated "IF Selector") 720. The user equipment host stack 730 may have assigned multiple IP addresses in Internet protocol version 6 ("IPv6") and Internet protocol version 4

("IPv4") address tables. Each interface may assign unique IP address(es). Also, the user equipment applications may use one or more IPv6 or IPv4 address(es). Additionally, standard Berkeley sockets (also known as "BSD socket application program interfaces ("APIs")") are not capable of selecting the used source address and radio interface per socket from multiple alternatives, thereby requiring new APIs.

The new API (e.g., RConnection) in the Symbian operating system ("OS") enables the user equipment to select from multiple services simultaneously in third generation ("3G") networks. However, from an end-to-end application [e.g., browser, e-mail client, file transfer protocol ("FTP")-client, etc. and one of which is designated 740] or user point of view, the selection mechanisms have been clumsy in user equipment such as 3G terminals. It is usual that each application 740 in the user equipment be configured manually to use certain access point names provided by the cellular operator. In the general packet radio service ("GPRS"), the access point name identifies a certain gateway GPRS support node ("GGSN") providing connectivity to some external IP network (e.g., which corresponds to the SAE GW in the LTE/SAE).

Thus, in the user equipment such as second generation/third generation ("2G/3G") cellular radio terminals, there is not an automated mechanism for selecting dynamically the most proper access point name and IP address for end-to-end applications 740 in the user equipment that takes cost, performance, etc., into consideration. In accordance with the system as disclosed herein, it would be beneficial if the installed end-to-end applications 740 could use automatically (i.e., without user intervention) the access point name/IP address that is associated with the local IP breakout service that provides low cost cellular access and high end-to-end performance. The signaling diagrams as described with respect to FIGS. 10 et seq. provide logic for selecting an SAE GW access point name and a local GW access point name that accommodates using the local IP breakout service for new end-to-end sessions and on the other hand allows network originated SAE bearer sessions (such as "long distance calls") in parallel.

Figure 8:
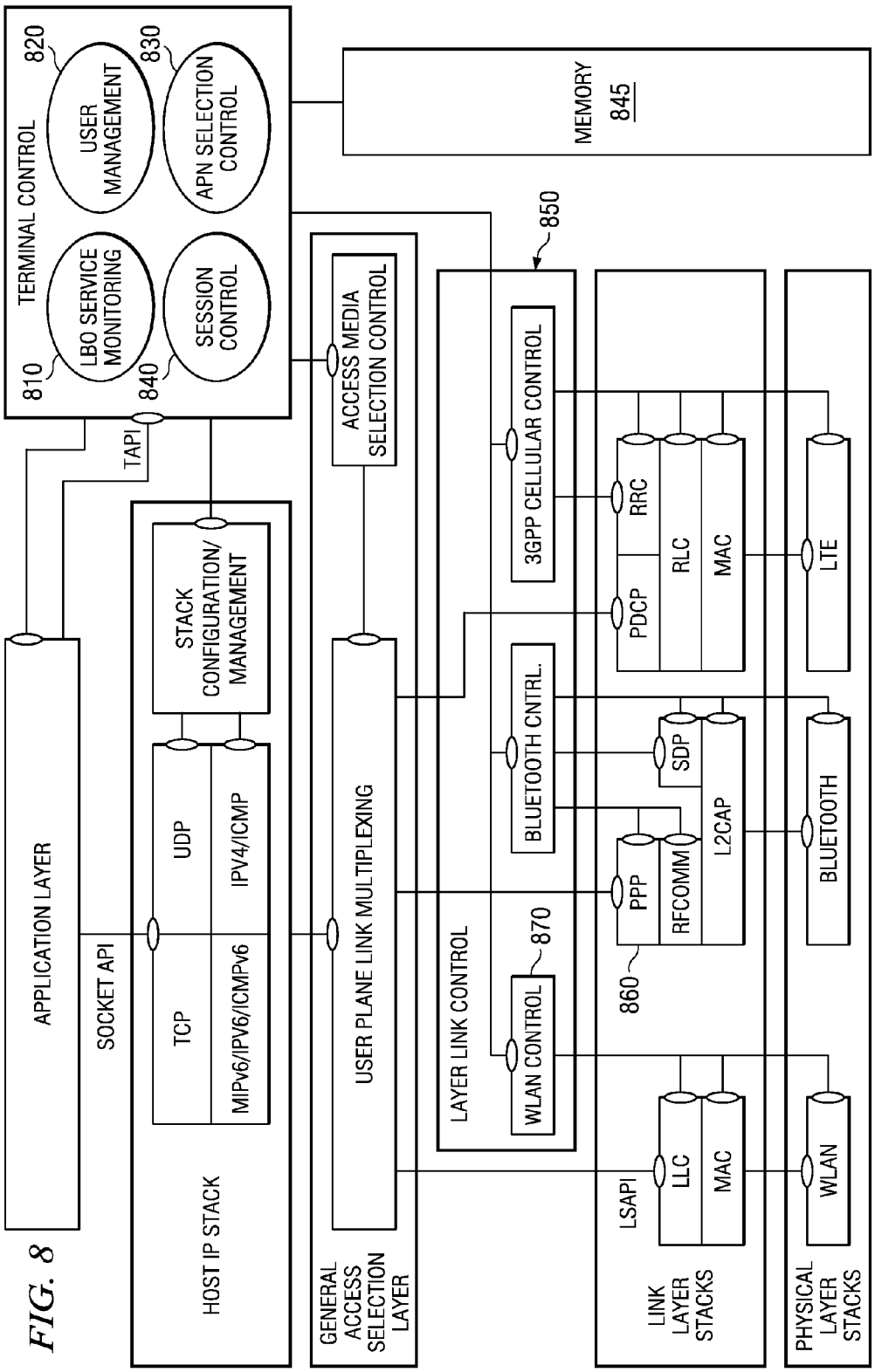
FIG. 8 illustrates a system level diagram of an embodiment of user equipment that provides an environment for application of the principles of the present invention.

Turning now to FIG. 8, illustrated is a system level diagram of an embodiment of user equipment that provides an environment for application of the principles of the present invention. The access point name selection logic related tasks may be a part of user equipment or terminal control employable to configure application level access point name settings dynamically to select the access point name/IP addresses per user end-to-end session establishment request based on detected local IP breakout service availability. The local breakout service monitoring subsystem 810 uses the information received from a user management subsystem 820 to detect if the user equipment has a local IP breakout service activated or not. When the user equipment has the local IP breakout service activated, the local breakout service monitoring subsystem 810 uses information received from a link layer control level to detect the availability of the user-plane connectivity for the local IP breakout services. As illustrated in FIG. 8, the link layer control function is provided by a link layer control ("LLC") subsystem 850, a point-to-point protocol function is performed by a point-to-point protocol ("PPP") subsystem 860, and a wireless local area network function is performed by a wireless local area network ("WLAN") subsystem 870.

Figure 9:
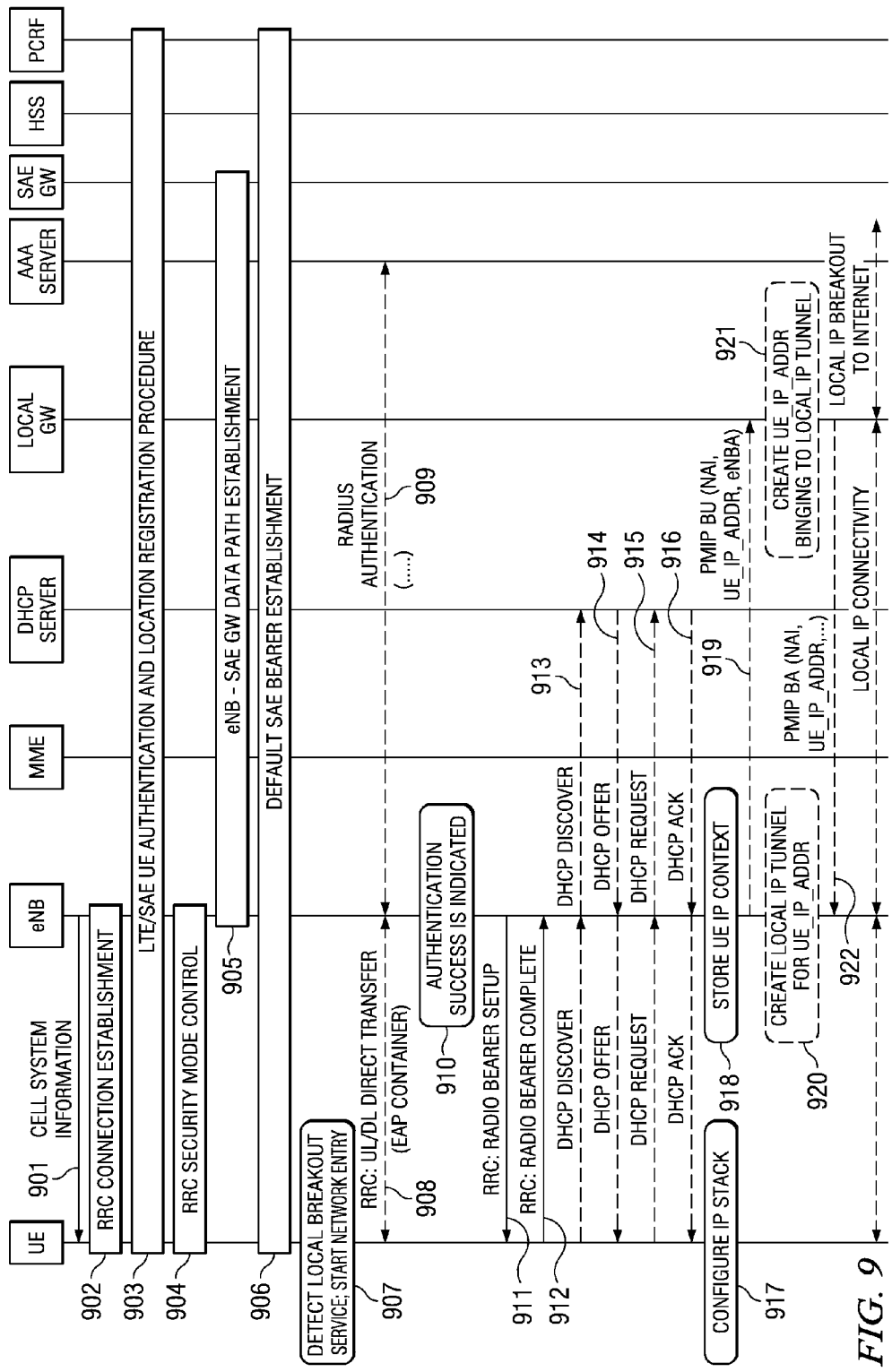
FIG. 9 illustrates a signaling diagram demonstrating an exemplary method of providing a local IP breakout service constructed according to the principles of the present invention.

Before addressing the aforementioned logic for selecting an SAE GW access point name and local GW access point name, FIG. 9 illustrates a signaling diagram demonstrating an exemplary method of providing a local IP breakout service in accordance with the principles of the present invention. The functions indicated with dashed lines are optional. The signaling flow for a user equipment network entry procedure to the local IP breakout service in an LTE/SAE communication network is described. FIG. 9 also demonstrates a user equipment initial attach procedure to an LTE/SAE communication network after which the user equipment is able to continue with the user equipment network entry procedure to a local IP breakout service. If the user equipment is already registered in the LTE/SAE communication network, user equipment authentication can be omitted and the user equipment network entry procedure to a local IP breakout service may start immediately after the user equipment is connected to an LTE cell and SAE bearer-related configurations are completed.

In a step 901, cell system information is received in the user equipment (designated "UE") from a serving base station (designated "eNB") of a public mobile network. The serving base station periodically transmits cell system information data on a broadcast channel in order to advertise LTE radio coverage availability, network identifiers and physical properties of the radio link. Based on the received system information, the user equipment selects an LTE/SAE operator and LTE cell with the best signal quality over a radio interface after the user equipment power has been switched on, or upon entering a new LTE/SAE communication network, or after having moved from an LTE_IDLE (power saving) state back to an LTE_ACTIVE state. The cell system information may contain information elements that advertise the availability of a local IP breakout service (e.g., pre-configured in the base station in its radio network configuration data).

In a step 902, radio resource control ("RRC") connection establishment is carried out between the user equipment and the serving base station. After selecting the LTE cell, the user equipment is to establish radio link connectivity with the serving base station on the control plane by using an LTE standard RRC connection establishment procedure.

In a step 903, LTE/SAE user equipment authentication and location registration procedure is carried out. If the user equipment has not yet registered in the LTE/SAE communication network (e.g., after switching power on) or after entering a new LTE/SAE communication network (e.g., when radio coverage is lost from the previous network), the authentication and location registration procedure is executed within the communication network according to an LTE/SAE standard procedure. If the user equipment is already registered in the current LTE/SAE communication network, user context data is to be available in the mobility management entity (designated "MME") and the required portion of it can be retrieved from the base station without re-authentication (e.g., after the user equipment has moved from an LTE_IDLE (power saving) state to back to an LTE_ACTIVE state). The user equipment performs authentication using ordinary LTE/SAE initial access towards the MME and obtains tunneled IP connectivity via an SAE gateway (designated "SAE GW") as usual. An authentication, authorization, and accounting server (designated "AAA Server") provides an interface between the devices and security servers through which access control can be set up. A home subscriber server (designated "HSS") provides the functions of the home location register ("HLR") and the functions of the user mobility server ("UMS"), and a policy and charging rules function server (designated "PCRF") uses knowledge of available resources and customer profiles for the authorization of the session.

In a step 904, a RRC security mode control is provided between the user equipment and the serving base station. The LTE/SAE standard security mode control procedure is to be executed after the authentication procedure in order to start user data ciphering over the radio interface. In a step 905, the SAE gateway data path establishment is carried out between the serving base station and the SAE gateway. The communication network establishes the required user-plane tunnels to be used for the default SAE bearer services via the SAE gateway.

In a step 906, a default SAE bearer establishment is carried out for the user equipment. The communication network is to set up the default SAE bearer service in the SAE gateway, serving base station, and user equipment. From now on, the user equipment has the default IP connectivity via the SAE gateway on the user-plane. At this moment, the user equipment may detect that a local IP breakout service is available on the basis of received information in the cell system information, or non-access stratum ("NAS") level signaling received from the MME either during authentication procedure or pushed location based service information, or stored cell identification, tracking area and network identification information in the user equipment, or end-user intervention from application level. After being authenticated and registered via the MME, the user equipment may assign a local IP address for a local IP breakout service from an IP gateway by using its DHCP client.

In a step 907, the availability of a local IP breakout service is detected in the user equipment, and a network entry process is started. In a step 908, radio resource control related uplink/downlink direct transfer is carried out between the user equipment and the serving base station. If the local IP breakout service requires separate authentication, in a step 909, the user equipment performs an authentication procedure to a local AAA server via the serving base station that provides, for instance, an internet engineering task force specified authentication protocol ("RADIUS") client. For example, extensive authentication protocol ("EAP") messages are carried with RRC direct transfer messages over the radio link control plane and the serving base station encapsulates/decapsulates EAP containers in RADIUS protocol messages to/from the local AAA server. This local authentication can be omitted if the authentication to the ordinary LTE/SAE communication network services is trusted also for the local IP breakout service. In a step 910, successful authentication is indicated to the serving base station.

After successful authentication, the serving base station sets up a required user context and a radio bearer for the local IP breakout service that differentiates user data traffic from the ordinary LTE/SAE bearer service. In a step 911, the radio bearer for the local IP breakout service is established for the user equipment. In a step 912, the user equipment responds according to LTE standard with a radio bearer complete message. From now on, the user-plane connectivity for the local IP breakout service is available over the radio link.

If the user equipment has not received an IP address for the local IP breakout service during the local authentication procedure, it obtains an IP address using a DHCP protocol. DHCP messages are to be transmitted as user-plane data over the newly established radio bearer. The serving base station provides a DHCP relay service in order to forward the DHCP messages to a local DHCP server (designated "DHCP Server"). In a step 913, the first DHCP message from the user equipment is DHCP discovery, according to an Internet engineering task force ("IETF") standard procedure. In a step 914, the local AAA server responds to the user equipment with a DHCP offer message containing an IP address. The serving base station stores the carried information in the user context data. In a step 915, the user equipment sends a DHCP request to the AAA server indicating that it will use the offered IP address. In a step 916, the AAA server responds to the user equipment with a DHCP "Ack" indicating that the IP address lease is confirmed. The serving base station ensures that the DHCP procedure is performed correctly and completely in order to finalize storing the user IP context data for the local IP breakout service.

In a step 917, the user equipment configures its IP stack either on the basis of received configuration data in authentication, or using DHCP. A 3GPP compliant user equipment associates the newly configured IP address with an access point name that could have been given to the user equipment in its subscription data (e.g., pre-configured), in non-access stratum ("NAS") level signaling from a service core network (in step 903), advertised by an LTE base station (e.g., in step 901), in local authentication (in steps 908 and 909), or in DHCP signaling (in steps 913 to 916). In a step 918, the serving base station stores the IP context of the user equipment. Once the user equipment has configured its IP stack, the radio bearer for the local IP breakout service has been set up and the serving base station has configured its network interface to route the local user data, the network entry process to the local IP breakout service is completed and the local IP connectivity is available for transferring user data.

If the IP gateway for the local IP breakout service resides higher in the IP network topology behind multiple router hops, the serving base station establishes a local IP tunnel, for instance, using a proxy mobile Internet protocol ("PMIP"). If the local IP gateway is the base station's next hop router (e.g., the local IP breakout router is either the base station itself or an external IP router to which the base station connects via an L2 switched network such as an Ethernet LAN), this step can be omitted as the user data need not be tunneled at all (the user equipment's IP address is assigned from the topologically correct IP subnet, so ordinary IP routing works).

In steps 918 and 919, standard PMIPv6 routing control protocol related messages are exchanged between the local gateway (designated "Local GW") and the serving base station. In a step 920, the serving base station creates a local IP tunnel for UE_IP_ADDR. A UE_IP_ADDR binding the local IP tunnel is created in the local gateway in a step 921. In a step 922, a local IP gateway that supports PMIP responds with a PMIP binding acknowledge message. The user-plane IP connectivity is now available for the local IP breakout service, and also when local tunneling is used over multiple router hops.

The fastest entry to an LTE cell occurs in inter-base station-handovers when the serving base station transfers the user context to a target base station during a handover preparation phase. Once the user equipment has obtained radio link connectivity in the target cell/base station, a user-plane tunnel is to be switched to an SAE gateway and an SAE bearer service is set up automatically on the basis of received user context data. If the user equipment enters a local IP breakout service coverage area as a result of an inter base station handover, steps 901 to 906 in the previous signaling flow of FIG. 9 are to be replaced with a standard inter-base station handover procedure, after which the user equipment detects the availability of a local IP breakout service and proceeds to steps 907 to 922 as explained above.

Having concluded a general overview, a solution is now introduced for using an IP gateway (e.g., access router) for a local IP breakout services directly from a LTE base station while retaining user access control and SAE bearer services in the LTE/SAE operator's service core network. It is assumed for the purposes of this discussion, that the registration to the LTE/SAE communication network is retained and both the default SAE bearer services using an IP address and an access point name ("APN") from the SAE gateway will be available in parallel with the IP address and the access point name associated for the local IP breakout service.

Normally, when the user equipment has not initiated a local IP breakout service, it will operate as usual using the "single APN" and IP address from the SAE gateway. When the user equipment has activated a local IP breakout service and its associated access point name and IP address, the operation thereof shall be as set forth below. The user equipment is configurable so that the user-equipment initiated sessions use the access point name associated with the local IP breakout service by default. In other words, it is the preferred access point name when the local IP breakout service is available and activated by using the network entry procedure to a local IP breakout service.

The access point name for the SAE bearer services are put on hold for the user-equipment initiated sessions, but the user equipment keeps this access point name in standby in order to respond to a network-originated session(s). The default SAE bearer is active from the network point of view. In other words, no actions are required to modify the current SAE bearer services in the service core network nodes or in the base station.

The base station is aware of the local IP breakout service and provides separate radio bearer services both for the SAE bearer and local IP breakout services in order to differentiate user traffic. The base station provides a direct access connection for the local IP breakout service either using IP tunneling to a local IP gateway, or without IP tunneling being itself the next hop IP router for the user equipment, or using the IP router that is connected near the base station.

In communication network originated sessions, the user equipment selects and initiates the used application instance and binds it either to the SAE bearer service access point name, or to the local IP breakout service access point name based on the radio bearer through which the session initiation was invited. When the communication network originated session for the SAE bearer service is terminated, the user equipment clears the application binding to the SAE bearer service access point name. In other words, the access point name returns to standby automatically.

When the user equipment exits the local IP breakout coverage area, IP connectivity using the associated IP address may be lost. The local IP breakout access point name is put on hold for the new user equipment initiated sessions and the SAE bearer service access point name becomes the default. The local IP breakout access point name and its associated IP address may be stored in the user equipment either until the DHCP lease time for the associated IP address expires, or the user/user equipment registration in a local AAA server expires (via, for instance, appropriate timers employed in the user equipment). When the user equipment re-enters a local IP breakout coverage area and IP connectivity using the associated IP address is regained before access point name expiration has occurred, the local IP breakout access point name will be set again as the default access point name for the user-equipment originated sessions, etc.

The same rules for selection between SAE gateway access point name and local gateway access point name may be applied also in the LTE user equipment that are multi-access capable. The local IP breakout service may use other radio access like WLAN, worldwide interoperability for microwave access ("WiMax"), etc. The availability of the local IP breakout service may be detected in the user equipment, for instance, by scanning beacons from WLAN access points in the background. When the user equipment enters a local IP breakout service, it is bound to the used radio interface in addition to the local gateway access point name and its associated IP address.

Before reviewing the flow diagrams as set forth below, exemplary systems of the present invention will be addressed principally in view of the system level diagram of FIG. 8. A system for acquiring an access point name for an application employing a local IP breakout service by user equipment communicating with a base station is provided herein. The system includes a user management subsystem 820 for selecting and initiating the application and a local breakout service monitoring subsystem 810 for monitoring availability of the local IP breakout service. The user management subsystem 820 in the user equipment, a radio control and a user management subsystem in the base station (see, e.g., the eNodeB in FIG. 3), a user management subsystem in the service core network elements (see, e.g., the MME in FIG. 3), and an access control subsystem in the local servers and in the local IP gateway (see, e.g., the AAA in FIG. 1) cooperate to obtain an access point name from the local IP breakout service when the service is available using a network entry procedure for the local IP breakout service. The system also includes an access point name selection control subsystem 830 for binding the access point name to the application and putting on hold an access point name for a system architecture evolution ("SAE") gateway. In a related embodiment, the access point name selection control subsystem 830 in the user equipment obtains an access point name from the SAE gateway when the local IP breakout service is not available.

In yet another related embodiment, the local breakout service monitoring subsystem 810 detects a loss of availability of the local IP breakout service, and the access point name selection control subsystem 830 places on hold the access point name from the local IP breakout service and uses the access point name for the application from the SAE gateway. A memory 845 of the system stores the access point name from the local IP breakout service for a time period less than a dynamic host configuration protocol ("DHCP") lease time for an Internet protocol address associated with the application or a duration of user equipment registration in a local authentication, authorization, and accounting ("AAA") server.

In yet another related embodiment, the local breakout service monitoring subsystem 810 detects availability of the local IP breakout service and regains an associated Internet protocol address from the local IP breakout service in cooperation with a radio control and a user management subsystem in the base station (see, e.g., the eNodeB in FIG. 3) and a user management subsystem in the service core network element (see, e.g., the MME in FIG. 3). The access point name selection control subsystem 830 then sets the access point name from the local IP breakout service as a default access point name, when the access point name from the local IP breakout service is stored in the user equipment (e.g., memory 845). In yet another related embodiment, the link layer control subsystem 850/WLAN control subsystem 870 in the user equipment scans beacons from wireless local area network ("WLAN") access points.

In another aspect, a system for acquiring an access point name for a network-originated application requiring an Internet protocol local breakout service by user equipment communicating with a base station is provided herein. The system includes a session control subsystem 840 for selecting and initiating the network-originated application, and a link layer control subsystem 850 for determining a radio bearer through which the network-originated application is invited. The system also includes an access point name selection control subsystem 830 for obtaining an access point name from a network-originated service inviting the network-originated application and binding the access point name to the network-originated application. In a related embodiment, the system includes a session control subsystem 840 for releasing the access point name from the network-originated application upon termination of the network-originated application.

Figure 10:
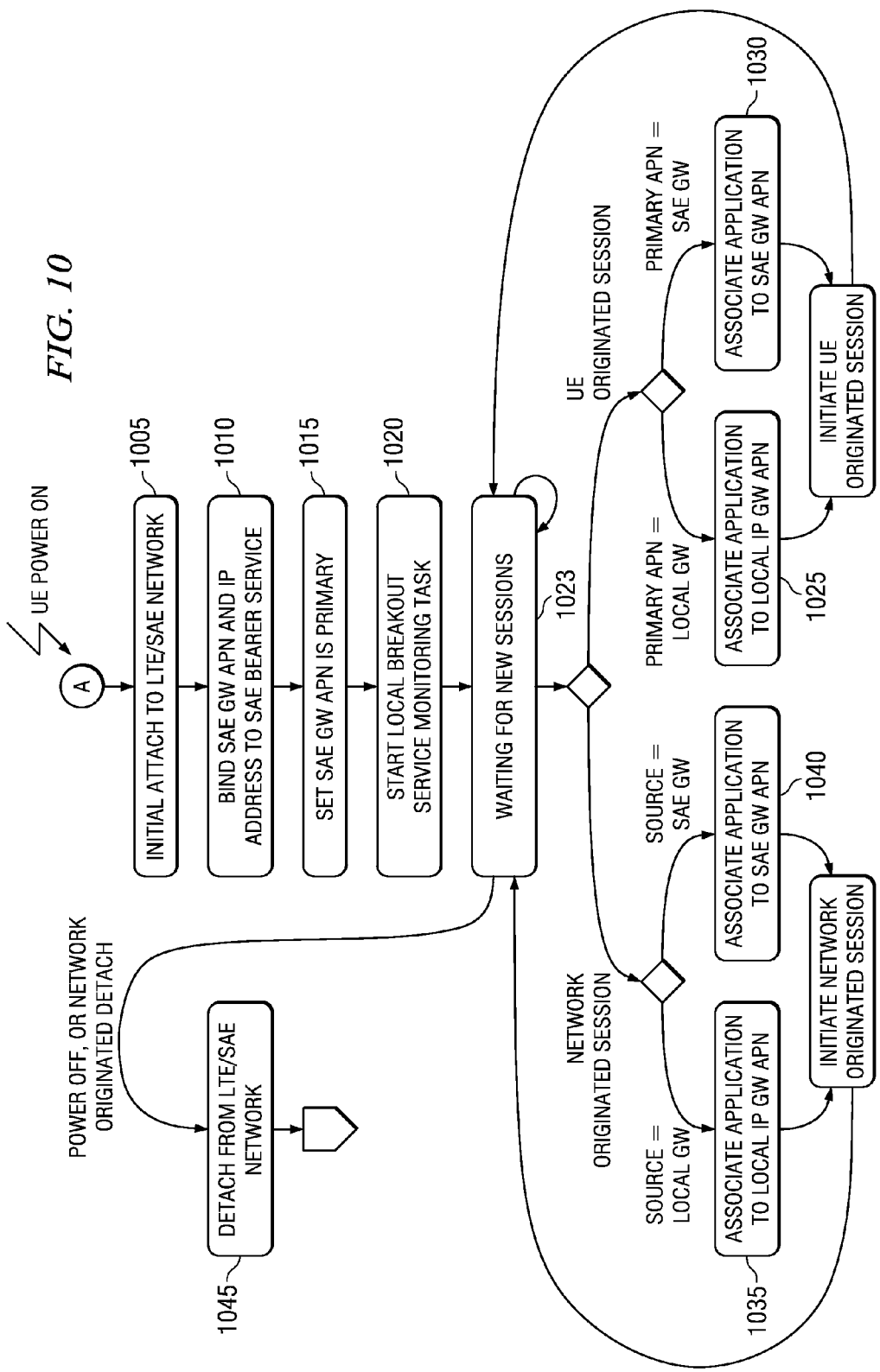
FIGS. 10 and 11 illustrate flow diagrams of a method of operating a communication system constructed in accordance with the principles of the present invention.
Figure 11:
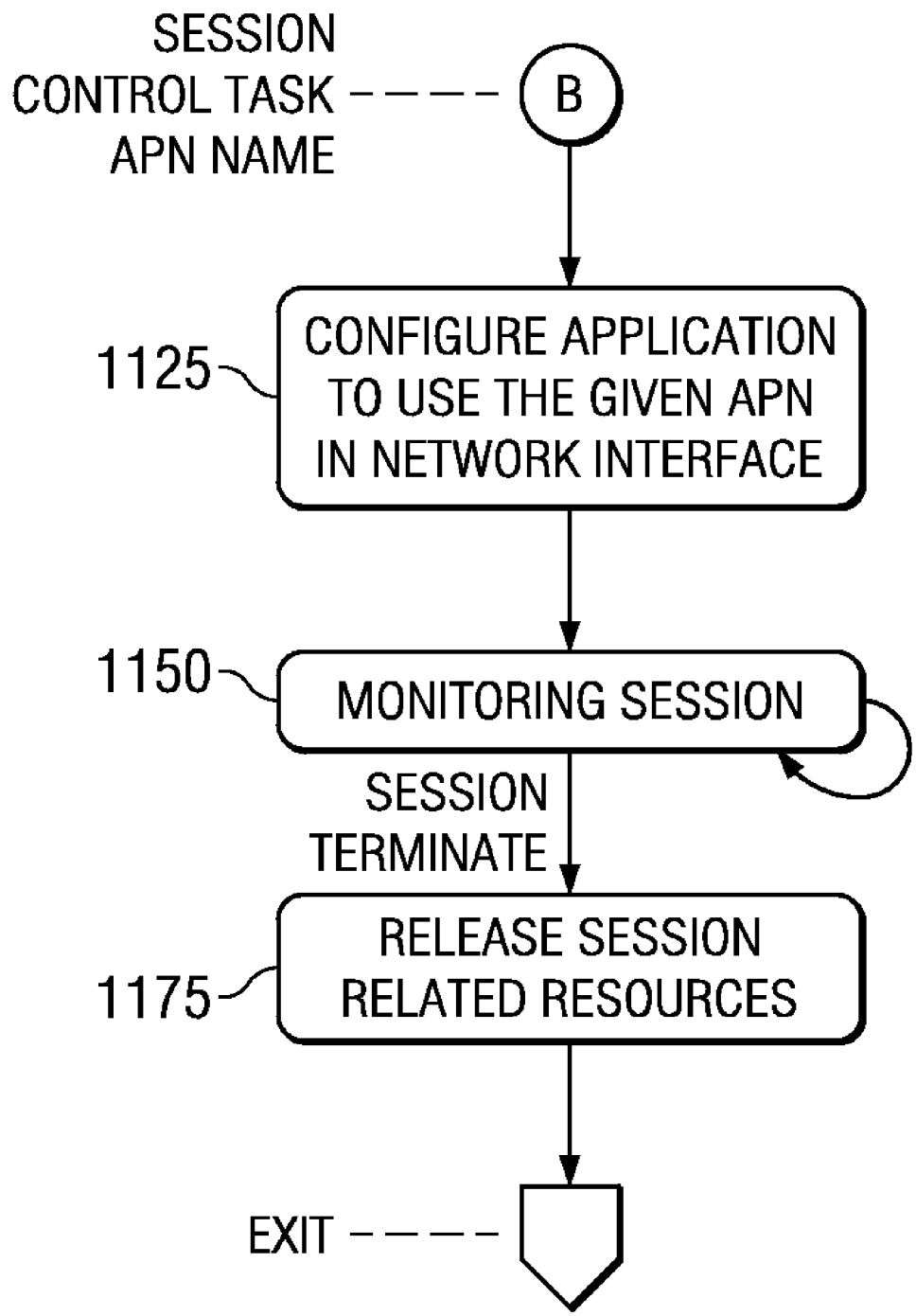

Turning now to FIGS. 10 and 11, illustrated is a flow diagram of a method of operating a communication system in accordance with the principles of the present invention. More specifically, FIG. 10 demonstrates selection logic for an SAE gateway access point name and a local gateway access point name for new sessions. The SAE bearer service is initiated on default upon user equipment initial network entry to the LTE/SAE communication network. In the case that it is enabled in the user equipment subscription data, the user equipment will start monitoring the availability of a local IP breakout service as a background task, as illustrated and described below herein.

In the case wherein the user equipment has activated a local IP breakout service in the background, then the selection logic for the used access point name will associate the local IP gateway access point name for all the user equipment originated sessions, the local IP gateway access point name for network originated session via the local IP gateway, and the SAE gateway access point name for network originated session via the SAE gateway.

When the user equipment is initially powered on, it initially attaches to an LTE/SAE communication network at a step 1005. An access point name is bound to the SAE gateway, and an IP address is obtained for the SAE bearer service provided thereby at a step 1010. The SAE gateway access point name is set as the primary access point name at a step 1015, and the user equipment and initiates a local IP breakout service-monitoring task 1020. In accordance with waiting for a new session at a step 1023, if the user-equipment-originated session is detected in association with the running of a new application, then the user equipment preferably associates the application with a local IP gateway access point name to initiate the user equipment-originated session at a step 1025. Alternatively, the user equipment associates the application with an SAE gateway application name 1030.

If a network-originated session is detected in association with the running of a new application, then the user equipment preferably associates the application with a local IP gateway access point name to initiate the user equipment-originated session at a step 1035. Alternatively, the user equipment associates the application with an SAE gateway application name at a step 1040. Upon termination of operation of the user equipment, i.e., it is powered off, or if the network originates a "detach," then the user equipment detaches from the LTE/SAE network and may power down at a step 1045.

As illustrated in the flow diagram in FIG. 11, selection logic will initiate a session by starting a session-control task that configures a session to use a given access point name, either for a user-equipment initiated or network initiated session. The session-control task will run in the background and terminate when the session is ended. A new application is configured to use the access point name provided via the LTE/SAE network interface at a step 1125. The session control task monitors the session at a step 1150, and upon termination of the session, releases session-related resources at a step 1175.

Figure 12:
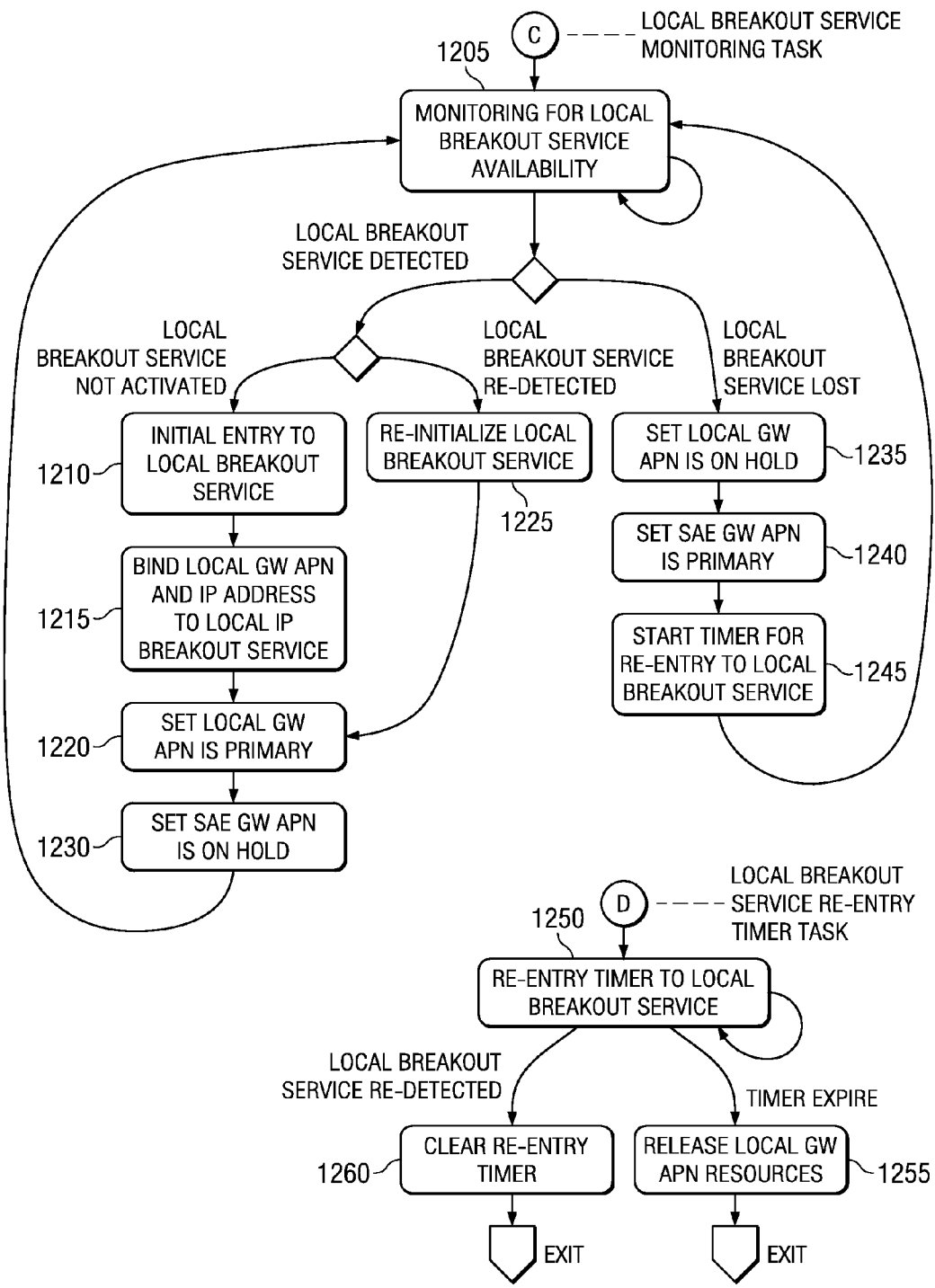
FIG. 12 illustrates a flow diagram of a method of operating a communication system constructed in accordance with the principles of the present invention.

Turning now to FIG. 12, illustrated is a flow diagram of a method of operating a communication system in accordance with the principles of the present invention. More specifically, FIG. 12 demonstrates a local IP breakout service availability-monitoring task that operates in the background. The main loop for the local IP breakout service-monitoring task monitors the availability of the local IP breakout service. When entry into a local IP breakout service coverage area is detected and the user equipment has not activated service, the network entry procedure for a local IP breakout service will be executed, and a new local gateway access point name will be set as the primary access point name. When the user equipment moves out of the local IP breakout service coverage area, a timer is started in order to allow quick re-entry to the service area if the service becomes available again without a full network entry procedure.

As illustrated with respect to step "C" in the flow diagram in FIG. 11, the user equipment monitors availability of local IP breakout service at a step 1205. If local IP breakout service is detected, but has not been activated, entry into the local IP breakout service is initiated at a step 1210. A local gateway access point name and IP address for the local IP breakout service is bound at a step 1215, and the local gateway access point name is set as primary at a step 1220. If local IP breakout service is re-detected at a step 1225, then the local gateway access point name is also set as primary at a step 1220. In either case, the SAE gateway access point name is placed on hold at a step 1230, and monitoring for local IP breakout service availability continues at a step 1205.

When the user equipment monitors availability of local IP breakout service at a step 1205, and local IP breakout service is lost, then the local gateway access point name is placed on hold at a step 1235, and the SAE gateway access point name is set as primary at a step 1240. A local IP breakout service reentry timer is started to enable reentry into the local IP breakout service at a step 1245, and availability of local IP breakout service will continue to be monitored at a step 1205

As illustrated with respect to step "D" in the flow diagram in FIG. 12, the local IP breakout service reentry timer is monitored when the local IP breakout service is lost at a step 1250. When the local IP breakout service reentry timer expires, the local gateway access point name resources are released at a step 1255. If the timer has not expired and local IP breakout service is re-detected, the local IP breakout service is reentered, and the reentry timer is cleared/reset at a step 1260.

Thus, the system as introduced herein provides a solution for the binding problem between an application and two access point names and IP addresses associated with a single access network interface in the user equipment. The system also provides an opportunity to an LTE subscriber to use a low cost IP access automatically for user-equipment initiated sessions whenever a local IP breakout service is available. When the preference rules are configured into the user equipment, no further user intervention is required for access point name selection in the user-equipment initiated sessions. Readiness for network-originated sessions using an SAE bearer service is maintained. The access point name bindings to different radio bearers enable differentiation of user data both in the user equipment and a base station. The local IP breakout access point name may be bound also to another radio interface such as a WLAN when the user equipment is multi-access capable. Further, the present invention provides a computer program product stored in a computer readable storage medium including instructions for performing the functions as described herein. The computer program product may be installed and run in user equipment and a base station operable according to evolved universal terrestrial radio access network ("E-UTRAN") standards. Although the invention has been illustrated in connection with LTE and E-UTRAN communication systems, it is understood that the invention is also applicable to other modes of operations or to other wireless communication platforms.

A solution is provided for the problem of using multiple IP addresses associated with a single network interface (e.g., IP multi-homing in user equipment) from the end-user application level. The IP-based applications such as a web-browser, a voice over Internet protocol ("VoIP") client, an e-mail application, a messenger, etc., can be bound to one IP address/access point name at a time. As introduced herein, with local IP breakout service, two IP addresses/access point names can be obtained, one of which can be selected and bound when an end-user application is started. The user equipment processes that provide access point name selection are transparent to the end-user application. In the case where the user equipment has activated a local IP breakout service in the background, then the selection logic for the chosen access point name will associate (a) the local IP gateway access point name for the user equipment originated sessions (e.g., a user initiates an IP application for web browsing, a VoIP call, etc., performed by a session control subsystem in the user equipment), (b) the local IP gateway access point name for a network-originated session via the local IP gateway (e.g., an incoming call to a user on a local VoIP call or message, etc., performed by a session control subsystem in the user equipment), and (c) the SAE gateway access point name for a network-originated session via the SAE gateway (e.g., an incoming call to a user on a long distance VoIP call when a VoIP client application instance runs using an SAE gateway access point name, performed by a session control subsystem in the user equipment).

In one embodiment, the present invention provides a method of acquiring an access point name for an application employing a local Internet protocol local breakout service by user equipment communicating with a base station. The method includes selecting and initiating the application (e.g., as performed by a user management subsystem in the user equipment), monitoring availability of the local IP breakout service (e.g., as performed by a local breakout service monitoring subsystem in the user equipment), and obtaining an access point name from the local IP breakout service when the service is available using a network entry procedure for the local IP breakout service (e.g., as performed by a user management subsystem in the user equipment, a radio control and a user management subsystem in the base station, a user management subsystem in the service core network elements, and an access control subsystem in the local servers and in the local IP gateway). The method also includes binding the access point name to the application (e.g., as performed by an access point name selection control subsystem in the user equipment) and putting on hold an access point name for a system architecture evolution ("SAE") gateway (e.g., as performed by an access point name selection control subsystem in the user equipment). It should be understood that while an SAE gateway is mentioned above, any gateway capable of providing access from a cellular system to an external packet switch network (e.g., a GGSN node in a universal mobile telecommunications system ("UMTS") service core network) is equally applicable. In a related embodiment, the method includes obtaining an access point name from the SAE gateway when the local IP breakout service is not available (e.g., as performed by an access point name selection control subsystem in the user equipment).

In yet another related embodiment, the method includes detecting a loss of availability of the local IP breakout service (e.g., as performed by a local breakout service monitoring subsystem in the user equipment), placing on hold the access point name from the local IP breakout service (e.g., as performed by an access point name selection control subsystem in the user equipment), and using the access point name for the application from the SAE gateway (e.g., as performed by an access point name selection control subsystem in the user equipment). The method includes storing in the user equipment (e.g., memory) the access point name from the local IP breakout service for a time period less than a dynamic host configuration protocol ("DHCP") lease time for an Internet protocol address associated with the application or a duration of user equipment registration in a local authentication, authorization, and accounting ("AAA") server.

In yet another related embodiment, the method includes detecting availability of the local IP breakout service and regaining an associated Internet protocol address from the local IP breakout service (e.g., as performed by a local breakout service monitoring subsystem in the user equipment, a radio control and a user management subsystem in the base station and a user management subsystem in the service core network element), and setting the access point name from the local IP breakout service as a default access point name (e.g., as performed by an access point name selection control subsystem in the user equipment), when the access point name from the local IP breakout service is stored in the user equipment (e.g., memory). In yet another related embodiment, the monitoring further includes scanning beacons from wireless local area network ("WLAN") access points (e.g., as performed by a link layer control/WLAN control subsystem in the user equipment).

In another aspect, the present invention provides a method of acquiring an access point name for a network-originated application requiring an Internet protocol local breakout service by user equipment communicating with a base station. The method includes selecting and initiating the network-originated application (e.g., as performed by a session control subsystem in the user equipment), and determining a radio bearer through which the network-originated application is invited (e.g., as performed by a link layer control subsystem in the user equipment). The method also includes obtaining an access point name from a network-originated service inviting the network-originated application (e.g., as performed by an access point name selection control subsystem in the user equipment), and binding the access point name to the network-originated application (e.g., as performed by an access point name selection control subsystem in the user equipment). In a related embodiment, the method includes releasing the access point name from the network-originated application upon termination of the network-originated application (e.g., as performed by a session control subsystem in the user equipment).

As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, as described herein. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
at least one processor; and
at least one memory including computer program code, the at least one memory and the computer program code configured, with the at least one processor, to cause the apparatus at least to
initiate an Internet protocol application;
monitor availability of a local Internet protocol local breakout service and to obtain an access point name from said local Internet protocol local breakout service when said local Internet protocol local breakout service is available; and
bind said access point name to said Internet protocol application.

2. The apparatus as recited in claim 1 wherein said access point name is obtained using a network entry procedure for said local Internet protocol local breakout service.

3. The apparatus as recited in claim 1 wherein said access point name obtained from said local Internet protocol local breakout service is stored in the at least one memory.

4. The apparatus as recited in claim 1 wherein said access point name obtained from said local Internet protocol local breakout service is stored in the at least one memory for a time period less than a dynamic host configuration protocol lease time for an Internet protocol address associated with said Internet protocol application or for a duration of an apparatus registration in a local authentication, authorization, and accounting server.

5. The apparatus as recited in claim 1 wherein the at least one memory and the computer program code are further configured, with the at least one processor, to cause the apparatus at least to put on hold said access point name for a gateway capable of providing access from a cellular communication system to an external packet switch network when said access point name is bound to said Internet protocol application.

6. The apparatus as recited in claim 5 wherein said gateway is a system architecture evolution gateway.

7. The apparatus as recited in claim 1 wherein the at least one memory and the computer program code are further configured, with the at least one processor, to cause the apparatus at least to detect a loss of availability of said local Internet protocol local breakout service, and place on hold and store in the at least one memory said access point name for said Internet protocol application for said local Internet protocol local breakout service and to use said access point name for said Internet protocol application from a gateway.

8. The apparatus as recited in claim 7 wherein the at least one memory and the computer program code are further configured, with the at least one processor, to cause the apparatus at least to detect restored availability of said local Internet protocol local breakout service, regain an Internet protocol address from said local Internet protocol local breakout service, and set as a default access point name said access point name obtained from said local Internet protocol local breakout service.

9. The apparatus as recited in claim 1 wherein the at least one memory and the computer program code are further configured, with the at least one processor, to cause the apparatus at least to obtain said access point name from a gateway capable of providing access from a cellular communication system to an external packet switch network when said local Internet protocol local breakout service is not available.

10. The apparatus as recited in claim 1 wherein said initiation of said Internet protocol application is in response to a network-originated or an apparatus-originated session.

11. An apparatus, comprising:
means for initiating an Internet protocol application;
means for monitoring availability of a local Internet protocol local breakout service;
means for obtaining an access point name from said local Internet protocol local breakout service when said local Internet protocol local breakout service is available; and
means for binding said access point name to said Internet protocol application.

12. The apparatus as recited in claim 11, further comprising:
means for detecting a loss of availability of said local Internet protocol local breakout service;
means for placing on hold and storing said access point name for said Internet protocol application for said local Internet protocol local breakout service;
means for using said access point name for said Internet protocol application from a gateway;
means for detecting restored availability of said local Internet protocol local breakout service;
means for regaining an Internet protocol address from said local Internet protocol local breakout service;
means for setting as a default access point name said access point name obtained from said local Internet protocol local breakout service.

13. A computer program product comprising program code stored in a non-transitory computer readable medium configured to initiate an Internet protocol application, monitor availability of a local Internet protocol local breakout service, obtain an access point name from said local Internet protocol local breakout service when said local Internet protocol local breakout service is available, and bind said access point name to said Internet protocol application.

14. The computer program product as recited in claim 13 wherein said program code stored in said non-transitory computer readable medium is configured to detect a loss of availability of said local Internet protocol local breakout service, place on hold and store said access point name for said Internet protocol application for said local Internet protocol local breakout service, use said access point name for said Internet protocol application from a gateway, detect restored availability of said local Internet protocol local breakout service, regain an Internet protocol address from said local Internet protocol local breakout service, and set as a default access point name said access point name obtained from said local Internet protocol local breakout service.

15. A method, comprising:
initiating an Internet protocol application;
monitoring availability of a local Internet protocol local breakout service;

obtaining an access point name from said local Internet protocol local breakout service when said local Internet protocol local breakout service is available; and binding said access point name to said Internet protocol application.

16. The method as recited in claim 15 wherein said access point name obtained from said local Internet protocol local breakout service is stored in memory for a time period less than a dynamic host configuration protocol lease time for an Internet protocol address associated with said Internet protocol application or for a duration of an apparatus registration in a local authentication, authorization, and accounting server.

17. The method as recited in claim 15 further comprising putting on hold said access point name for a gateway capable of providing access from a cellular communication system to an external packet switch network when said access point name is bound to said Internet protocol application.

18. The method as recited in claim 15, further comprising:
detecting a loss of availability of said local Internet protocol local breakout service;
placing on hold and storing in memory said access point name for said Internet protocol application for said local Internet protocol local breakout service; and
using said access point name for said Internet protocol application from a gateway.

19. The method as recited in claim 18, further comprising:
detecting restored availability of said local Internet protocol local breakout service;
regaining an Internet protocol address from said local Internet protocol local breakout service; and
setting as a default access point name said access point name obtained from said local Internet protocol local breakout service.

20. The method as recited in claim 15 further comprising obtaining said access point name from a gateway capable of providing access from a cellular communication system to an external packet switch network when said local Internet protocol local breakout service is not available.

21. An apparatus, comprising:
at least one processor; and
at least one memory including computer program code,
the at least one memory and the computer program code configured, with the at least one processor, to cause the apparatus at least to
initiate a network-originated application;
determine a radio bearer through which said network-originated application is invited; and
obtain an access point name from a network-originated service inviting said network-originated application and bind said access point name to said network-originated application system.

22. The apparatus as recited in claim 21 wherein the at least one memory and the computer program code are further configured, with the at least one processor, to cause the apparatus at least to release said access point name from said network-originated application upon termination of said network-originated application.

23. The apparatus as recited in claim 21 wherein said apparatus is user equipment in a cellular communication system.

24. An apparatus, comprising:
means for initiating a network-originated application;
means for determining a radio bearer through which said network-originated application is invited;
means for obtaining an access point name from a network-originated service inviting said network-originated application; and
means for binding said access point name to said network-originated application system.

25. The apparatus as recited in claim 24 further comprising means for releasing said access point name from said network-originated application upon termination of said network-originated application.

26. A computer program product comprising program code stored in a non-transitory computer readable medium configured to initiate a network-originated application, determine a radio bearer through which said network-originated application is invited, obtain an access point name from a network-originated service inviting said network-originated application, and bind said access point name to said network-originated application system.

27. The computer program product as recited in claim 26 wherein said program code stored in said non-transitory computer readable medium is configured to release said access point name from said network-originated application upon termination of said network-originated application.

28. A method, comprising:
initiating a network-originated application;
determining a radio bearer through which said network-originated application is invited;
obtaining an access point name from a network-originated service inviting said network-originated application; and
binding said access point name to said network-originated application system.

29. The method as recited in claim 28 further comprising releasing said access point name from said network-originated application upon termination of said network-originated application.

30. The method as recited in claim 28 wherein said method is performed by user equipment in a cellular communication system.

* * * * *